United States Patent [11] 3,631,440

| [72] | Inventor | Arnie L. Cliffgard<br>9268 Daisey Avenue, Fountain Valley,<br>Calif. 92708 |
|---|---|---|
| [21] | Appl. No. | 839,322 |
| [22] | Filed | July 7, 1969 |
| [45] | Patented | Dec. 28, 1971 |

[54] LIQUID LEVEL DETECTOR
6 Claims, 2 Drawing Figs.

[52] U.S. Cl. .................................................... 340/244 C,
340/59
[51] Int. Cl. ..................................................... G08b 21/00,
B60q 1/00
[50] Field of Search............................................ 340/244,
244 A, 244 B, 244 C, 244 D, 59; 73/295, 304, 304
C, 204; 323/68, 69; 317/132; 307/117; 219/501

[56] References Cited
UNITED STATES PATENTS

| 3,333,258 | 7/1967 | Walker et al. | 340/244 C |
| 3,363,466 | 1/1968 | Guidi | 340/244 C |
| 3,416,131 | 12/1968 | MacKenzie | 340/244 C |
| 3,466,467 | 9/1969 | Houcke et al. | 307/302 |
| 3,477,460 | 11/1969 | Dotto | 340/244 C |
| 2,928,037 | 3/1960 | Lawrence | 340/244 UX |
| 2,972,684 | 2/1961 | Elliot et al. | 317/132 UX |
| 3,222,661 | 12/1965 | Vasel et al. | 340/228 |
| 3,449,737 | 6/1969 | Stewart | 340/248 C |

*Primary Examiner*—John W. Caldwell
*Assistant Examiner*—Daniel Myer
*Attorney*—Hinderstein & Silber ABSTRACT: A liquid level detector comprising a voltage-divider network, including a thermistor, connected between the terminals of a battery so that the potential at the voltage-divider output varies as a function of the resistance of the thermistor. The voltage-divider output is connected to the input of a voltage-sensitive switching circuit which is connected via a Zener diode to one of the battery terminals whereby the Zener diode provides a reference voltage level which is independent of current and battery voltage fluctuations. The voltage-sensitive switching circuit has two stable states and is either in one state or the other depending upon whether the potential at the voltage-divider output is above or below the reference level provided by the Zener diode. When the potential at the voltage-divider output indicates that the thermistor is out of a good heat conductor such as a liquid, the switching circuit closes a series circuit between the battery and a lamp so that the lamp provides a visual indication of the low liquid level condition. According to a preferred embodiment of the invention, the reference voltage level provided by the Zener diode has first and second discrete, controllable values depending upon whether the potential at the voltage-divider output is greater or less than the reference level provided by the Zener diode to permit independent control of the activation and deactivation of the lamp.

Patented Dec. 28, 1971

3,631,440

INVENTOR.
ARNIE L. CLIFFGARD
BY
Hinderstein & Silber
ATTORNEYS

LIQUID LEVEL DETECTOR

BACKGROUND OF THE INVENTION

1. Filed of the Invention

The present invention relates to a liquid-level detector and, more particularly, to a circuit for determining and indicating when the level of liquid in a container goes below a predetermined level.

2. Description of the Prior Art

Systems of the type to which the present invention relates, which operate to indicate the presence of absence of a liquid at a predetermined level, are useful in a variety of situations. For example, the present liquid level detector and indicator may be used to indicate whether the coolant level in the radiator of an automobile, truck, tractor, or any other internal combustion engine is at or below a predetermined level. The present device would be especially useful in such an environment since modern automobiles typically have only a warning light which indicates when the engine temperature has exceeded a predetermined maximum value. However, such an indication results suddenly without adequate warning for the driver of the automobile to take suitable preventive measures. On the other hand, with the present device, as soon as the coolant level in the radiator became low, the operator would have a warning that additional coolant was required and it would not be necessary to wait until the radiator overheated.

Many other situations would similarly benefit from a liquid level detector. As examples, the present device may be used as a brake fluid level alarm, a gasoline low-level alarm, an oil level low-level alarm, a water tank level alarm for campers and house trailers, a butane tank level alarm for campers and house trailers, and a battery water level alarm. In addition, many other possible uses for a device which indicates when the liquid level in a tank goes below a predetermined level will become immediately apparent to those skilled in the art.

Many different types of circuits have been proposed to perform this function in one or more of these environments. Many of these circuits have used a thermistor, an electrical resistance element whose ohmic value varies inversely with its temperature, as the sensing element. A thermistor is an ideal sensing element since with current flowing therethrough, its temperature will rise due to self-heating, thereby causing its resistance to decrease exponentially. With the thermistor immersed in a poor heat conductor, such as air, the temperature continues to rise until equilibrium is reached where the heat generated in the thermistor is dissipated as fast as it is created. On the other hand, when the thermistor is cooled by some fluid such as water or oil, its resistance value remains relatively high.

Although many circuits exist which utilize a thermistor for liquid level detection, many problems exist with these circuits which make them quite impractical. In the first instance, most prior art circuits are quite complex, bulky and expensive. For example, the June 1969, issue of Popular Science magazine discloses, on pages 116-119, an oil level indicator which utilizes a thermistor as the sensing element. However, as shown in the circuit diagram on page 119, the circuit includes eight transistors, three diodes, two lamps and many resistors, capacitors and switches. Therefore, although the circuit is operative, it is both costly and difficult to construct.

Another typical problem with available liquid level detectors is that they are often sensitive to supply voltage fluctuations. This represents a significant problem where the device is used in an automobile since the battery voltage in a typical automobile varies by as much as 3 to 5 volts under normal driving conditions.

SUMMARY OF THE INVENTION

According to the present invention, there is provided a novel circuit for detecting and providing a visual alarm when the liquid level in a container goes below a predetermined reference level. The present circuit has a minimum number of circuit components, i.e. three transistors, one thermistor, one Zener diode, one capacitor, six resistors and one lamp, so that it may be easily manufactured and provided at a relatively low price. In addition, the present liquid level detector requires no adjustments and is totally insensitive to battery voltage fluctuations.

Briefly, the present circuit consists of a resistor and a thermistor connected in series between the plus and minus terminals of an automobile battery so that the voltage at the junction between the resistor and thermistor varies depending upon whether the thermistor is immersed in a good or bad heat conductor. The junction between the resistor and thermistor is connected to the input of a voltage-sensitive switching circuit which is connected directly to the positive terminal of the car battery and through a Zener diode to the negative terminal of the automobile battery. The Zener diode provides a reference voltage which is independent of current. The voltage-sensitive switching circuit has two stable states and is either in one state or the other depending upon whether the voltage at the junction between the thermistor and resistor is above or below a predetermined reference level. When the voltage at the junction indicates that the thermistor is out of the liquid, the switching circuit closes a series circuit between the car battery and a lamp so that the lamp provides a visual indication of the low liquid level condition. According to a preferred embodiment of the invention, the reference level provided by the Zener diode has first and second discrete, controllable values depending upon whether the voltage at the junction is greater or less than the reference level to permit independent control of the activation and deactivation of the lamp.

It is, therefore, an object of the present invention to provide a novel liquid level detector.

It is a further object of the present invention to provide a liquid level detector which utilizes a thermistor as the sensing element.

It is a still further object of the present invention to provide a liquid level detector which is simple and inexpensive.

It is another object of the present invention to provide a liquid level detector which is insensitive to supply voltage fluctuations.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

DESCRIPTION OF THE PREFERRED EMBODIMENT

Figure 1:
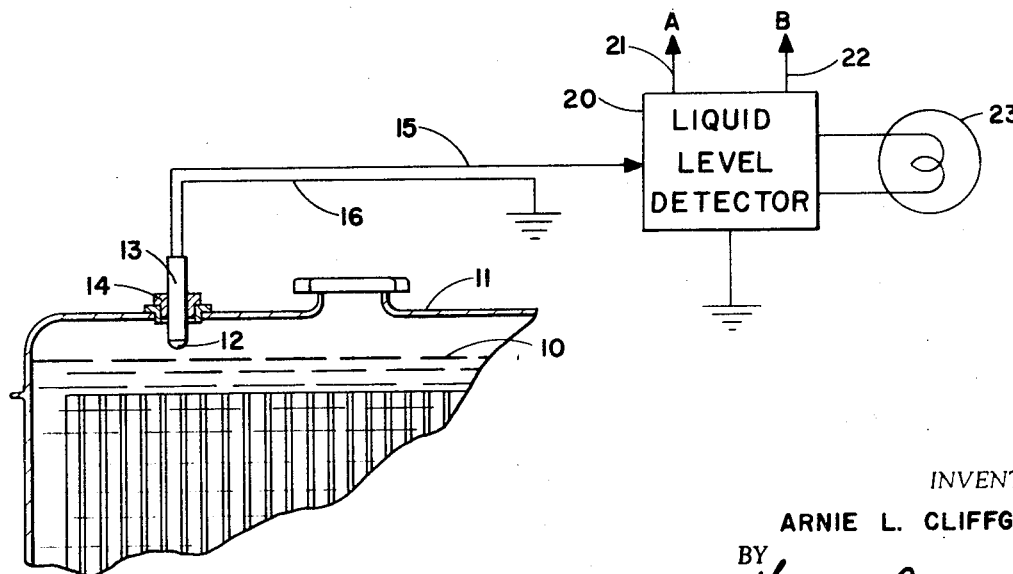
FIG. 1 is a diagram, partly in section, illustrating the manner in which the present liquid level detector may be used in connection with an automobile radiator; and, FIG. 2 is a schematic circuit diagram of a device constructed in accordance with the teachings of the present invention.

Referring now to the drawings and, more particularly, to FIG. 1 thereof, the present liquid level detector, generally designated 20, may be utilized, by way of example, to monitor the level of a liquid 10 in a tank 11 such as the radiator of an automobile, truck, tractor or any other internal combustion engine. In order to monitor the level of liquid 10, a thermistor 12 attached to a suitable support 13 is mounted in radiator 11 by bracket means 14 so that thermistor 12 is at the desired level of coolant 10. With an electrical signal passing through thermistor 12, its resistance will indicate whether it is immersed in liquid 10 or whether it is immersed in air. When immersed in a poor heat conductor such as air, the resistance of thermistor 12 will be quite low. On the other hand, when thermistor 12 is cooled by liquid 10 in radiator 11, its resistance will be relatively high.

Electrical connection may be made to thermistor 12 via electrical leads 15 and 16. Lead 16 may be connected to a first source of reference potential such as the negative terminal of the vehicle's battery which, it will be assumed for the purpose of this application, is connected to ground. Lead 15 is connected to the input of liquid level detector and indicator 20 which has first and second output leads 21 and 22 and a visual indicating device 23, such as a lamp. As will be explained more fully hereinafter, output lead 21 is connected to a terminal A which is preferably an ignition accessory terminal and output lead 22 is connected to a terminal B which is connected to a second source of reference potential such as the positive ignition coil terminal on the vehicle's ignition switch.

Figure 2:
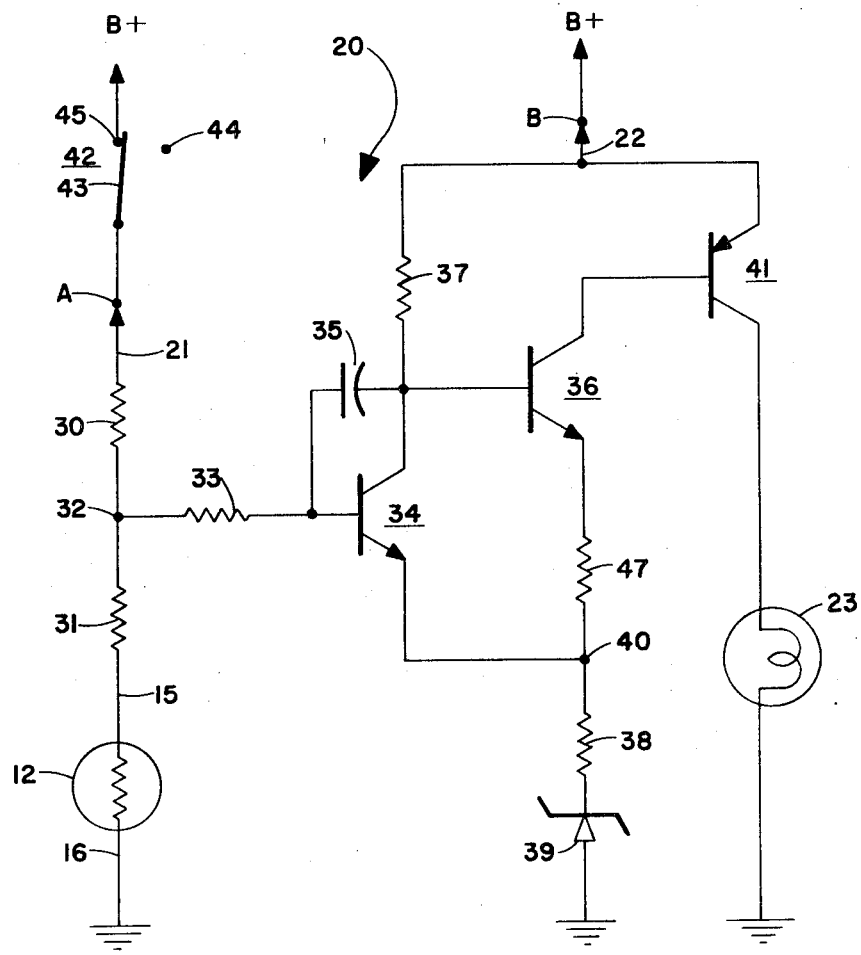

Referring now to FIG. 2, liquid level detector 20 consists of a pair of resistors 30 and 31 connected in series between output lead 21 and lead 15 of thermistor 12. The junction 32 between resistors 30 and 31 is connected to one end of a resistor 33, the other end of which is connected to the base of a transistor 34. The collector of transistor 34 is connected via a capacitor 35 back to its base. The collector of transistor 34 is also connected to the base of a transistor 36 and to one end of a resistor 37, the other end of which is connected to output lead 22. The emitter of transistor 36 is connected to one end of a resistor 47, the other end transistor 36 is connected to one end of resistor 38. The other end of resistor 38 is connected to the cathode of a Zener diode 39, the anode of which is connected to ground. The junction 40 between resistors 47 and 38 is connected to the emitter of transistor 34. The collector of transistor 36 is connected to the base of a transistor 41, the emitter of which is connected to output lead 22. The collector of transistor 41 is connected to one terminal of indicator lamp 23, the other terminal 41 is connected to one terminal of indicator lamp 23, the other terminal of which is connected to ground. Finally, it will be assumed that point A is connected to the same source of positive reference potential as point B through a single pole, double throw switch 42 having an arm 43 and first and second terminals 44 and 45. Arm 43 is connected to terminal A and terminal 45 is connected to the source of positive reference potential.

In operation, the potential at junction 32 is high with respect to ground when thermistor 12 is cooled by some fluid such as water, oil, etc. On the other hand, when thermistor 12 is immersed in a poor heat conductor such as air, its temperature rises due to self-heating and causes its resistance to decrease exponentially. Thus, as the temperature of thermistor 12 rises, the potential at junction 32 decreases until equilibrium is reached where the heat generated in thermistor 12 is dissipated as fast as it is generated. Thus, the potential 32 indicates whether thermistor 12 is immersed in a fluid or a gas.

The present circuit monitors the voltage at junction 32 and turns lamp 23 on or off for low or high potentials, respectively. Assuming first that thermistor 12 is in liquid 10, the potential at junction 32 will be higher than the potential at junction 40, the potential at the latter point being determined principally by the characteristics of Zener diode 39 plus the base-emitter voltage of transistor 34. Accordingly, under normal conditions, transistor 34 is conducting. Since the collector-to-emitter saturation voltage of transistor 34 id generally quite low, transistor 34 acts as a first switch element holding transistor 36 off. Finally, with transistor 36 being nonconducting, transistor 41 cannot conduct and lamp 23 remains unlit. In this sense, transistor 36 acts as a second switch element holding transistor 41 off.

When the level of liquid 10 in radiator 11 is lowered, such that thermistor 12 is surrounded by gas, its temperature rises and its resistance lowers so that the potential at junction 32 approaches ground. As the potential at junction 32 approaches the reference potential at junction 40, transistor 34 starts to turn off. As the voltage at the collector of transistor 34 rises, the current through resistor 37 begins to bias transistor 36 on. In addition, the feedback from transistor 34 to transistor 34 via resistor 47 which works against the impedance of resistor 38 plus the impedance of Zener diode 39 serves to aid in turning transistor 34 off. As a result, there is a very rapid toggle action in which either transistor 34 or transistor 36 is on. Except during switching, either transistor 34 or transistor 36 supplies a current through resistor 38 and Zener diode 39 in series so that Zener diode 39 can maintain junction 40 within a narrow range of voltage levels independently of supply voltage fluctuations. By proper selection of circuit values, the current through resistor 38 and Zener diode 39 may be held close to a constant value as transistors 34 and 36 change from one state to another.

If the circuit components are adjusted so that the voltage at junction 40 remains constant regardless of the state in which the circuit is in, switching from one state to the other will take place at the same resistance level of thermistor 12. However, if there is a slight change in current through resistor 38 when switching from one state to the other, there may be a slight dead band so that the resistance value of thermistor 12 at which the circuit will switch from one state to the other will be different from the resistance value at which it will return back to its original state. This is a desirable feature in that it permits control of the ease with which the circuit changes from one state to the other. Thus, lamp 23 may be prevented from flickering on and off due to very small input signal changes.

When transistor 36 conducts, it drives transistor 41 into saturation providing a closed series circuit between lamp 23 and the vehicle battery so that lamp 23 lights to indicate the low level of liquid 10 in radiator 11.

In essence, transistors 34 and 36 operate as a voltage-sensitive switching circuit which has two stable states and two reference levels and which is connected to junction 32 to monitor the voltage thereat. When the voltage at junction 32 is above the first reference level provided by Zener diode 39 and resistor 38, the switching circuit is in the first stable state. When the voltage at junction 32 is below the second reference level which may be different than the first reference level due to the change in current through resistor 38, the switching circuit is in the second stable state. In addition, the switching circuit controls the operation of transistor 41 which is simply a switch which turns lamp 23 on and off depending upon the state of the voltage-sensitive switching circuit. Finally, Zener diode 39 provides a reference voltage level so that the circuit may operate regardless of fluctuations in the battery voltage.

Resistor 47 operates as a limiting resistor to limit the current from the battery plus terminal through the emitter-base junction of transistor 41, through transistor 36 when lamp 23 is on. Capacitor 35 is an RF filter and prevents false indications that could be caused by electrical interference.

In applications such as radiator level alarms, the ignition of the vehicle generally provides an accessory disable terminal. Connecting point A to this terminal provides a circuit and bulb self-checking feature. As the starter is cranked, arm 43 of switch 42 is transferred to terminal 44. As a result, potential is removed from point A and the potential at junction 32 goes to ground. This has the same effect as when the liquid level is low such that bulb 23 should light. When the ignition switch is released, arm 43 of switch 42 goes into contact with terminal 45 and bulb 23 should go out completing the electrical check. For other applications where the self-check terminal is not available, points A and B are connected together.

The present circuit may also be used to simultaneously monitor the liquid level in a number of containers. For example, if it is desired to monitor the fluid level in the several chambers of a battery, a thermistor 12 would be positioned in each chamber. Each thermistor would then be connected via a resistor 31 to the common junction 32. Therefore, the only duplication of parts would be the duplication of thermistors 12 and resistors 31. In operation, as long as all thermistors are immersed in liquid, the resistance of each will be high and the combined parallel resistance will be high maintaining lamp 23 off. However, as soon as any thermistor leaves the liquid, its resistance decreases thereby decreasing the total parallel resistance and lighting bulb 23.

It can, therefore, be seen that in accordance with the present invention there is provided a liquid level detector which is simple, uncomplicated and can be easily installed in many environments. In addition, the present circuit has the advantage that it is insensitive to voltage fluctuations.

While the invention has been described with respect to a preferred physical embodiment constructed in accordance therewith, it will be apparent to those skilled in the art that various modifications and improvements may be made without departing from the scope and spirit of the invention.

I claim:

1. A liquid level detector for determining when the level of liquid in a container goes below a predetermined level, said detector being adapted for use with a voltage supply which provides first and second points of reference potential, comprising:

a resistor and a thermistor connected in series between said first and second points of reference potential, said thermistor adapted to be positioned in said container at said predetermined level; means operatively connected to and energized by said voltage supply for providing a third point of reference potential which is substantially independent of fluctuations of said voltage supply, said third point of reference potential having first and second discrete, controllable values depending upon whether the voltage at said junction is greater or less than said third point of reference potential;

voltage-sensitive switching means operatively coupled between the junction between said resistor and said thermistor and said third point of reference potential for comparing the voltage at said junction with said third point of reference potential; and indicator means for indicating whether said liquid level is above or below said predetermined level, said switching means being operative to activate or deactivate said indicator means depending upon whether the voltage at said junction is greater or less than said third point of reference potential.

2. A liquid level detector according to claim 1, wherein said means providing a third point of reference potential comprises;

a Zener diode, one end of said Zener diode being connected to said second point of reference potential; and a second resistor, one end of said second resistor being connected to the other end of said Zener diode, the other end of said second resistor providing said third point of reference potential.

3. A liquid level detector according to claim 2 wherein said voltage sensitive switching means comprises:

first and second transistors having base, collectors, and emitters, the emitter of said first transistor being operatively connected to said other end of said second resistor, the base of said first transistor being connected to said junction;

a third resistor, said third resistor being connected between said other end of said second resistor and the emitter of said second transistor; and a fourth resistor, said fourth resistor being connected between said first point of reference potential and the collector of said first transistor and the base of said second transistor, the collector of said second transistor being connected to said indicator means.

4. A liquid level detector according to claim 1 wherein said voltage-sensitive switching means has first and second stable states, said voltage-sensitive switching means changing to said first stable state when the voltage at said junction exceeds the first value of the potential at said third point of reference potential, said voltage-sensitive switching means changing to said second stable state when the voltage at said junction goes below the second value of the potential at said third point of reference potential.

5. A liquid level detector according to claim 4 wherein said indicator means is deactivated when said voltage-sensitive switching means is in said first stable state and is activated when said switching means is in said second stable state.

6. A liquid level detector for determining when the level of liquid in a container goes below a predetermined level, said detector being adapted for use with a voltage supply which provides first and second points of reference potential, comprising:

a first resistor and a thermistor connected in series between said first and second points of reference potential, said thermistor adapted to be positioned in said container at said predetermined level;

a Zener diode, one end of said Zener diode being connected to said second point of reference potential;

a second resistor, one end of said second resistor being connected to the other end of said Zener diode, the other end of said second resistor providing a third point of reference potential which is substantially independent of fluctuations of said voltage supply;

voltage-sensitive switching means operatively coupled between the junction between said first resistor and thermistor and said third point of reference potential or comparing the voltage at said junction with said third point of reference potential, said voltage-sensitive switching means comprising:

first and second transistors having bases, collectors, and emitters, the emitter of said first transistor being connected to said third point of reference potential;

a third resistor, said third resistor being connected between said first point of reference potential and the collector of said first transistor and the base of said second transistor;

a fourth resistor connected between said junction and the base of said first transistor;

a fifth resistor connected between the emitter of said second transistor and said third point of reference potential, said third and fifth resistors having different values whereby the current through said second resistor changes depending upon whether said first transistor or said second transistor is conducting, the value of said second resistor being small compared to the values of said third and fifth resistors; and a capacitor connected between the collector and the base of said first transistor; and indicator means connected to collector of said second transistor for indicating whether said liquid level is above or below said predetermined level, said voltage-sensitive switching means being operative to activate or deactivate said indicator means depending upon whether the voltage at said junction is greater or less then said third point of reference potential.

* * * * *